Fig.1.

March 25, 1958    H. R. HILL    2,827,767
FLUID ACTUATED CONTROL AND OPERATING MECHANISMS
Filed Dec. 7, 1955    9 Sheets-Sheet 5

Inventor
Harry Ronald Hill
By
Mann, Brown & McWilliams Attorneys

United States Patent Office 2,827,767
Patented Mar. 25, 1958

2,827,767

FLUID ACTUATED CONTROL AND OPERATING MECHANISMS

Harry Ronald Hill, Plymouth, Devon, England, assignor to Tecalemit Limited, Brentford, England Application December 7, 1955, Serial No. 551,697

24 Claims. (Cl. 60—97)

This invention relates to control apparatus and is more particularly concerned with the provision of such apparatus which is, at least in part, fluid operated.

The invention has for its principal object the provision of novel or improved control apparatus which is adapted to control a mechanism or a number of mechanisms in order to obtain a pre-determined sequence or arrangement of operations of the latter. A further object of the invention is the provision of such apparatus which can be so constructed and arranged that an automatic check is provided of the correct completion of the operations of the controlled mechanism or mechanisms.

According to the invention a control apparatus is provided for controlling in a pre-determined manner a number of operations of a mechanism or mechanisms utilising a master control unit and one or more slave control units each of which initiates the said mechanism or one of the said mechanisms and is connected with the master unit by means of a control line, wherein the master control unit comprises a sensing assembly having a plurality of fluid ports adapted to register with perforations in a perforated sensing member positioned in contact with the assembly, to allow the passage of a sensing fluid through the ports, and one or more fluid-operated devices, the or each of which, when operated by the said sensing fluid passing through a perforation, produces a signal which is transmitted along the control line to the slave control unit to cause the latter to actuate the corresponding mechanism.

The sensing member may take the form of a plate or other sheet member which is formed with a desired pattern of perforations adapted to produce the simultaneous operation of a number of individual mechanisms, which are selected by the pattern of the perforations in relation to the position of the fluid ports in the sensing assembly. It is preferred, however, to make use of an elongated sensing member, which is advantageously in the form of an endless belt (or which may consist of a number of individual belts) and to provide indexing mechanism for feeding this belt (or belts) forwardly in a step by step manner, in order to bring successive perforations opposite selected ports controlling one or a number of related mechanisms, so that as the belt is indexed forwardly the various mechanisms are caused to carry out a number of operations in a sequence and timed relationship which are determined by the positions of the perforations in the belt or belts.

As the sensing fluid either a gas or a liquid may be employed, but it is preferred to use compressed air.

For the control lines it is preferred to use a fluid, such as liquid or gas, pressure changes in which are transmitted to the slave control units along small-diameter pipes, which form the control lines. This control fluid may be the same as, or different from, the sensing fluid. For example, compressed air could be used for the sensing fluid and a liquid, such as oil, for the control fluid. When a control fluid is used the aforesaid fluid-operated devices will take the form of valves controlling the pressure or flow of this fluid, as supplied to the control lines.

It is also possible, however, to make use of other means, such as electrical means, to provide the control medium for operating the slave control units from the master control.

It is a further important feature of this invention that means may be provided, responsive to the completion by the, or each of, the aforesaid mechanisms of a pre-determined operation, for transmitting a return signal back to the master control unit. According to the invention this return signal may be transmitted back to the master control unit along the same control line which was used for the transmission of the initial control signal.

In the case of apparatus in which a movable control belt is used, which is indexed forward in order to produce a pre-determined sequence of operations of the controlled mechanisms, it is preferred to provide means associated with the indexing mechanism which will allow the latter to operate only after return signals have been received from all the slave control units to which control signals were previously transmitted, so that the fact that the indexing mechanism operates provides a positive indication that all the controlled mechanisms have completed their required operations.

The indexing mechanism may be arranged to operate automatically or solely under external control. Alternatively, however, means, which may be controlled by the position of perforations in the sensing member, may be provided for causing the indexing mechanism to cause the carrying out of a pre-determined sequence of operations automatically, after which further operation of the indexing mechanism is dependent on some external control.

The invention will now be more fully described, by way of example, as applied to a control apparatus which is operated by air under pressure and which comprises a master control unit which is connected by means of individual air pipe lines to a required number of slave control units, each of which latter is arranged to control a particular mechanism, the master control unit being designed to operate in conjunction with a sensing member or control medium in the form of an endless perforated belt in order to obtain a predetermined sequence of operations of the said mechanisms.

Referring to the drawings.

Referring first to Figures 1 to 5, the master control unit comprises a main face plate 1 which is attached to a suitable support, or to a removable back plate (not shown), by means of studs 2. The front plate 1 (and the back plate if used) are provided with bearings for the shafts 3 and 4 of two belt drums 5 and 6 respectively, and with a bearing or bearings for a shaft 7 on which an auxiliary roller 8 is rotatably mounted. An endless perforated sensing belt 9, which is preferably made of thin flexible sheet metal, is trained about the rollers 5, 6 and 8 and constitutes the control medium for the master control unit. The drum 5 is keyed to the shaft 3 and is provided with projections 10 which engage in sprocket holes 11 (Figure 6) formed in the belt 9, in order to provide a positive drive for the latter.

The bearings for the shaft 4 are provided by a block or blocks 12 (Figure 4) which is or are longitudinally adjustable in the face plate 1 (and the back plate if used), each under the control of a screw 13 passing through a pillar 14 mounted on the corresponding plate. Adjustment of the screw or screws 13 enables the tension of the belt 9 to be adjusted, while it also makes possible the removal of the belt and its replacement by a fresh belt, when required.

The upper run of the belt 9 passes between a base valve assembly or section 15, which is mounted by means of bolts 16 on the back of the plate 1, and a head valve assembly or section 17. This head 17 is mounted on a pair of pillars 18 which are slidably mounted in the base 15, in order that the head 17 may be raised and lowered away from and into engagement with the belt 9, as will be described.

Figure 1:
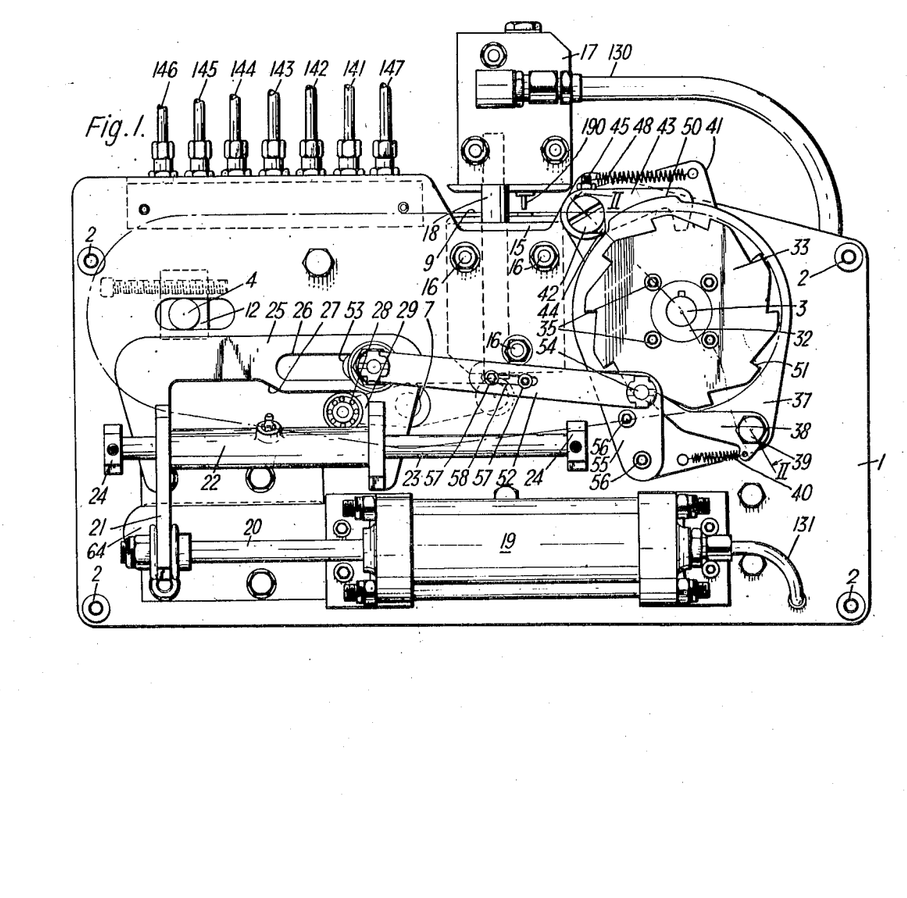
Figure 1 is a front elevational view of the master control unit, showing particularly those parts which are mounted on the front of the face plate of the unit.
Figures 2, 3:
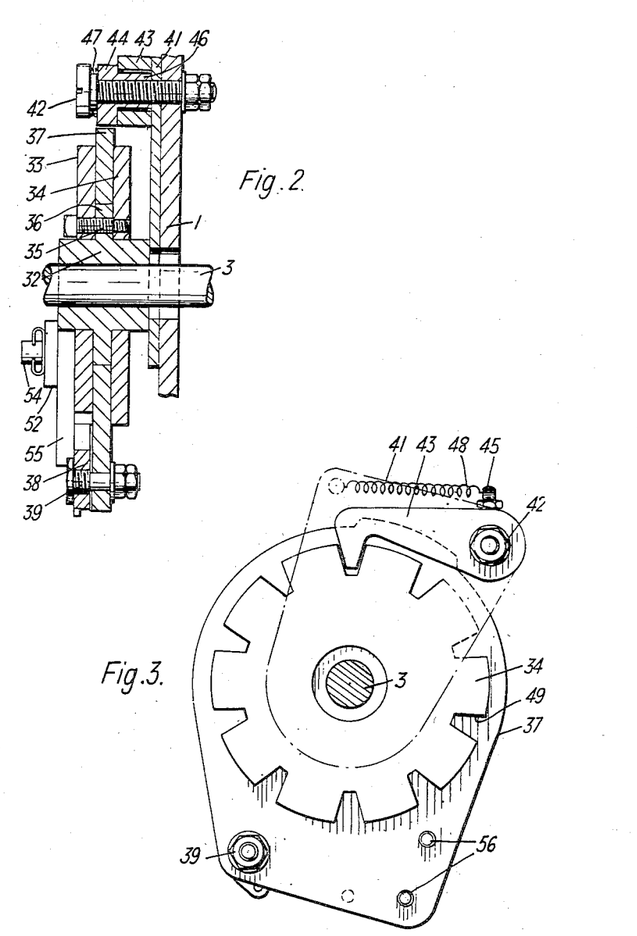
Figure 2 is a detail sectional view taken on the line II—II of Figure 1.
Figure 3 is a detail view from the rear, showing part of the mechanism which is mounted on the front of the face plate of the unit.

Referring more particularly to Figures 1 to 3, indexing mechanism is provided for raising and lowering the head 17 and for rotating the drum 5 in a step-by-step manner, so as to index the belt 9 forwardly, comprising a double-acting air operating cylinder 19 which is mounted on the front of the plate 1. The piston rod 20 of this cylinder is connected by means of a bridge 21 to a tubular slide 22, which slide is longitudinally slidable on a rod 23 which is mounted by means of brackets 24 on the plate 1. The slide 22 also includes a yoke piece 25 which is formed with a longitudinal slot 26 and with an underneath cam face 27. A roller 28 mounted on a crank arm 29 engages the cam face 27.

Figure 4:
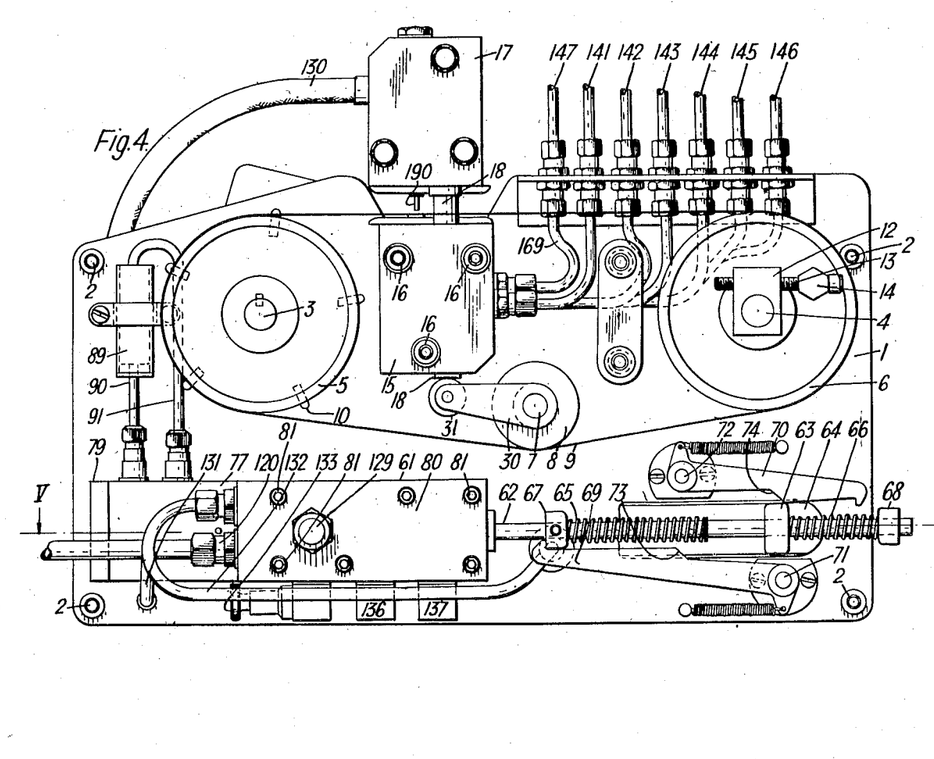
Figure 4 is a rear view, taken partly in section, showing particularly the parts which are mounted on the back of the face plate of the unit shown in Figure 1.

The crank arm 29 is secured to the shaft 7, which also carries a pair of additional crank arms 30 (Figure 4). These engage by means of rollers 31 with the lower ends of the pillars 18. In this way the head 17 is raised and lowered by the reciprocation of the yoke piece 25 produced by the operating cylinder 19.

Rigidly secured to the shaft 3 of the drum 5 is a boss 32 (Figures 1 and 2) carrying in front an indexing ratchet disc 33 and behind this a notched locking disc 34, which discs are secured to each other and to the boss 32 by means of studs 35. Freely rotatable on the central flange 36 of the boss 32, between the discs 33 and 34, is an oscillating drive plate 37. An indexing pawl 38 is pivoted by means of a stud 39 to the plate 37 and is biassed into engagement with the teeth of the ratchet disc 33 by means of a tension spring 40, the end of which is connected to the plate 37.

A fixed carrier plate 41 is secured to the plate 1 and carries, by means of a pivot bolt 42, a pivoted locking pawl 43 and a trip locking pawl 44. These pawls are rotatable relatively to one another through a limited angle which is determined by the engagement of the end of a set screw 45, which is screwed in the hub of the pawl 43, in a part-circumferential slot (not shown) which is formed in the sleeve portion 46 of the pawl. A helical spring 47 which is connected between the head of the bolt 42 and the trip locking pawl 44 biasses the latter in a counter clockwise direction.

A tension spring 48 connected between the set screw 45 and the carrier plate 41 biasses the locking pawl 43 into engagement with the notches 49 in the locking disc 34 but the pawl 43 is adapted to be disengaged from the disc 34 by the engagement of the trip locking pawl 44 by a projecting cam part 50 on the drive plate 37 during a clockwise rotation of the latter (as viewed in Figure 1). The resulting anti-clockwise turning of the pawl 44 is positively transmitted to the pawl 43 by the engagement of the end of the aforesaid part-circumferential slot in the former against the end of the set screw 45.

During the return anti-clockwise rotation of the drive plate 37 the cam part 50 engages the trip locking pawl 44 and first turns the latter clockwise relatively to the locking pawl 43, against the force of the spring 47, until the pawl 43 can engage in the next succeeding notch of the disc 34.

It will thus be seen that an angular oscillation of the drive plate 37, by an angular amount corresponding to the angular distance between the teeth 51 of the ratchet disc 33, produces a step-by-step rotation or indexing of the drum 5, which latter is held stationary during the return movements of the drive plate 37 by the locking pawl 43.

The oscillation of the drive plate 37 is effected from the yoke piece 25 by means of a connecting rod 52 (Figure 1). This rod is pivoted at one end to a slide 53 mounted in the slot 26 in the yoke piece 25, in order to provide a lost-motion connection, while its other end is pivoted at 54 to a projecting part 55 which is secured by means of studs 56 to the drive plate 37. The lost-motion connection provided by the slide 53 operating in the slot 26 provides for the piston 20 making a longer stroke than is required for operating the drive plate 37 and results in the indexing motion of the drum 5 being effected during the latter part only of the outward stroke (to the left as viewed in Figure 1) of the piston rod 20.

The connecting rod 52 is formed in two parts, which are connected together by means of bolts 57 passing through a slot 58 formed in one of the parts, in order that the length of the connecting rod 52 may be adjusted when setting up the apparatus.

Figures 5, 7, 16:
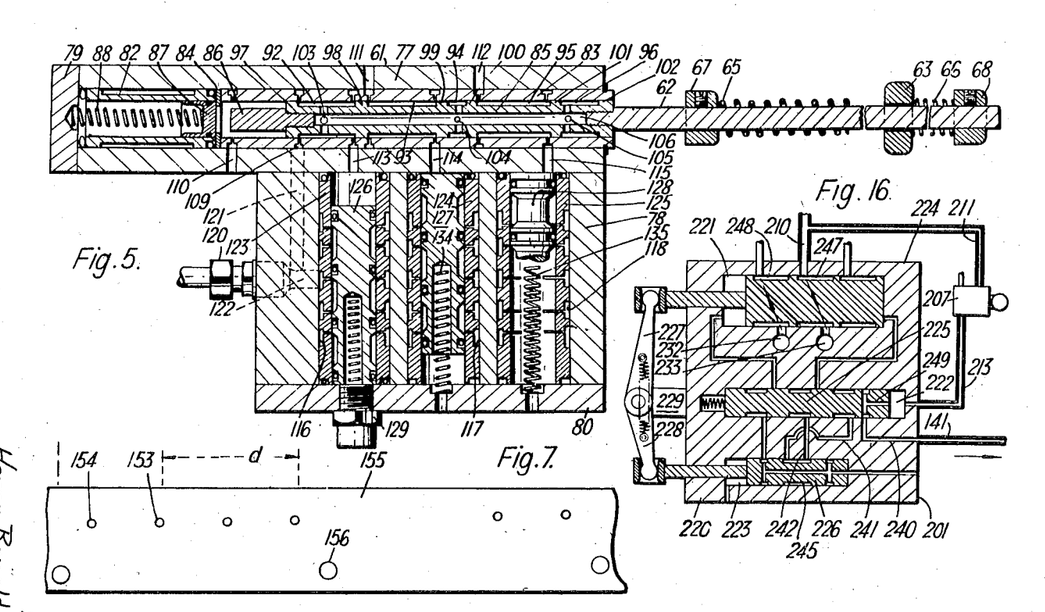
Figure 5 is a detail sectional view, taken on the line V—V of Figure 4, showing the main actuating valve of the master control unit.
Figure 7 is a plan view showing part of a modified form of belt, a number of which belts could be used in place of the single belt shown in Figure 6.
Figures 13 to 16 are partly-diagrammatic sectional views of one of the slave control units of Figure 12, showing successive stages in the operation thereof.

Referring now to Figures 4 and 5, the movement of the piston rod 20 is arranged to operate the main actuating valve 61 of the unit, which valve is secured to the back of the plate 1. The valve 61 is provided with an operating rod 62 which passes slidably through a lug 63. This lug is part of the bridge 21 and projects rearwardly through a slot 64 formed in the plate 1.

The movements of the lug 63 are transmitted to the rod 62 through thrust springs 65 and 66 which are interposed between the lug 63 and two thrust collars 67 and 68, which are secured to the rod 62. During the initial movement of the lug 63 in either direction, the movement of the rod 62 is prevented by the engagement of one or other of a pair of spring-urged pawls 69 and 70, which are pivoted to the plate 1 at 71 and 72 respectively, with the collar 67 or 68, as the case may be. As soon, however, as the lug 63 has completed a predetermined proportion of its stroke, during which is compresses the spring 65 or 66, this lug engages a cam face 73 or 74 on the pawl 69 or 70, respectively, in order to disengage that pawl from the corresponding collar 67 or 68. The operating rod 62 then carries out its stroke to operate the actuating valve.

Referring now more particularly to Figure 5, the actuating valve 61 comprises two body parts 77 and 78 and two cover plates 79 and 80, all of which parts are secured together by means of suitable studs or bolts, such as those shown at 81 in Figure 4. The part 77 is formed with an axial bore in which are assembled, with the provision of suitable packings and securing means of any suitable type, two sleeves 82 and 83 separated by a stop washer 84. Slidably mounted in the sleeve 83 is a hollow timing valve piston 85, which is secured at one end to the operating rod 62 and the other end of which is closed by a projecting striker 86. This striker, during the inward stroke of the valve 85 (to the left as viewed in Figures 4 and 5) engages a dash-pot piston 87 which is mounted in the sleeve or barrel 82 and which is urged to the right by means of a compression spring 88. The interior of the sleeve 82, behind the piston 87, is supplied with oil from a reservoir 89 (Figure 4) through a feed pipe 90 and a suitable nonreturn valve (not shown), which oil is returned to the reservoir 89 through a flow-restriction device (not shown) and a return pipe 91 during the movement of the piston 87 to the left, the whole providing a dash-pot of conventional form. This damps the movement of the timing valve 85 to the left but the movement of this valve to the right is unrestricted.

The timing valve piston 85 is formed externally with a series of annular lands 92, 93, 94, 95 and 96 which are bounded and separated from each other by annular sealing rings 97, 98, 99, 100, 101 and 102. Three series of ports 103, 104 and 105 connect the inner bore 106 of the valve 85 with the lands 92, 94 and 96, respectively.

The sleeve 83 and the body 77 are formed with an air inlet port 109, with three exhaust ports 110, 111 and 112 leading to atmosphere and with three transfer ports 113, 114 and 115, which latter open into three valve cylinders 116, 117 and 118 formed in the body 78. Service air, that is air under permanent pressure, is supplied from a suitable source through an inlet connection 120 and a passage 121 in the body 78 to the inlet port 109 and thence to the bore 106 in the piston 85, it being noted that this air connection is maintained open irrespective of the position of the piston 85. Service air is also supplied from the inlet 120 by way of a passage 122 and other passages (not shown) to central ports formed in the cylinders 116, 117 and 118.

The cylinders 116, 117 and 118 are fitted with sleeves 123, 124 and 125 respectively, in each of which is slidably mounted a piston valve 126, 127 or 128, respectively. The piston 126 is movable downwardly by service air pressure admitted through the port 113 under the control of the timing valve 85 and upwardly by service air pressure which is supplied to a lower inlet connection 129 by way of a connecting pipe 130 (Figure 1) under the control of series valves (to be described) which are provided in the head 17. The valve cylinder 116 is also formed with ports (not shown) which are connected by means of pipes 131 and 132 with the opposite ends of the cylinder 19. The parts of valve 116, 123, 126, which is of standard construction, are so designed that when the piston valve 126 is in its lower position, as shown in Figure 5, service air from the inlet 120 is supplied to the left-hand end of the cylinder 19 (as viewed in Figure 1) in order to cause the piston 20 to make its return (inward) stroke (away from the position shown in Figures 1 and 4). When the piston valve 126 is moved upwardly, by air admitted to the lower end of the cylinder 116 from the connection 129, it admits service air to the opposite (right hand in Figure 1) end of the cylinder 19 so as to cause the piston 20 to make an outward stroke. The valve 126 also provides, in known manner, for the exhaust of air from that end of the cylinder 19 opposite that to which pressure air is being admitted. This exhaust is effected through a pair of manually-adjustable exhaust valves, one of which is shown at 133 in Figure 4. By adjusting these valves the rate of travel of the piston 20 can be controlled.

The piston valves 127 and 128 are forced downwardly by service air pressure admitted by the ports 114 and 115, respectively, but their return movement is effected by the action of compression springs 134 and 135 respectively. For practical convenience the piston valves 127 and 128 are shown as being of the same standard construction as the piston valve 126, but the sleeves 124 and 125 and the related ports and passages in the valve block 78 are so constructed that the valves 127 and 128 control merely the supply of air from the inlet 120 to the base and head valve assemblies 15 and 17 (as will be described) and the exhaust of air from these assemblies.

The references 136 and 137 in Figure 4 indicate connections from the valve cylinders 117 and 118, which are connected by means of flexible pipes (not shown) with the base assembly 15 and with the head assembly 17, respectively.

When the valves 127 and 128 are in their upper positions, as shown in Figure 5, they are closed and cut off the flow of service air to the assemblies 15 and 17, while connecting the latter to exhaust. When the valves 127 and 128 are depressed by air pressure admitted through the ports 114 and 115, they close the exhaust ports (not shown) and connect the service air supply to the assemblies 15 and 17.

It may be noted that the construction of the timing valve 85 is such that when the valve is in the extreme right-hand position, as shown in Figure 5, the supply of air to the valve cylinders 117 and 118 is cut off, the upper ends of these cylinders being connected to the exhaust ports 111 and 112, respectively. When, however, the timing valve 85 is moved to the left air is admitted to the cylinders 117 and 118 to operate the valves 127 and 128 respectively, thereby causing service air to be supplied to the valve assemblies 15 and 17. It should be noted that the valves 127 and 128 are only depressed after the head assembly 17 has been lowered into contact with the belt 9 and also that the valve 85 is so designed that it cuts off the air supply to the cylinder 117 of the valve 127, which controls the supply of air to the base valve assembly 15, earlier in the course of its travel than the supply to the cylinder 118 of the valve 128, which controls the air supply to the head unit 17. The reason for this will be explained.

When the timing valve 85 is in its left hand position (Figure 5) the upper end of the cylinder 116 is open to the exhaust port 93, thus allowing the upward movement of the piston valve 126 to be effected by service air supplied under the control of the previously-mentioned series valves.

As has been stated above, the valves 126, 127 and 128 are of conventional design and their construction and the arrangement of the various associated ports and passages in the body 78 will not be further described.

The master control unit which has been described so far may be designed to operate and control any desired number of remote slave control units, to each one of which it is connected by means of a small bore pipe which transmits pulses of fluid pressure energy therebetween. Six such connecting pipes 141 to 146 inclusive are shown in Figures 1 and 4, but for convenience the operation of the apparatus will be described as applied to the control of three units only, utilising the connections 141, 142 and 143. The additional connection 147 is adapted to be connected to an external starting or control valve, as will be described.

Figure 6:
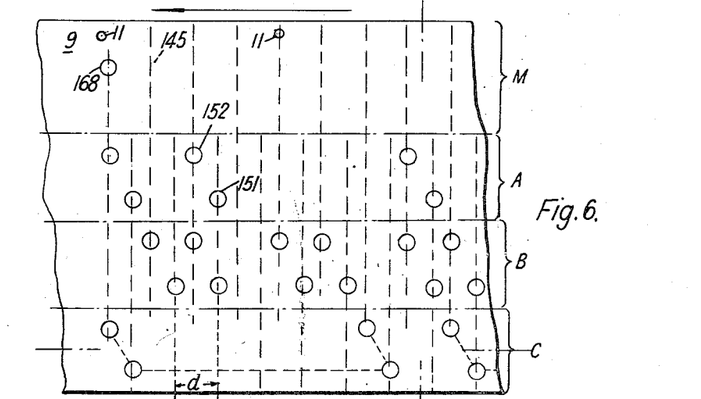
Figure 6 is a plan view showing part of a sensing belt which may be used in the apparatus of Figures 1 to 5.

The operation of the apparatus will be described on the basis of the use of a single perforated belt 9, such as is shown in Figure 6. The sensing perforations in this belt are arranged in longitudinal columns, A, B, C and M, one of the columns A, B and C being provided for each of the remote actuating units and the column M being provided for a master control, as will be described. In each of the columns A, B, and C the perforations are arranged in pairs, one perforation, such as 151, of each pair being an "action" perforation adapted to initiate the operation of the appropriate actuating unit and the other perforation, such as 152, being a "control" perforation, the purpose of which is to ensure that the next stage in the operation of the apparatus can only take place after the mechanism, the operation of which was initiated by the corresponding "action" perforation has completed this operation, as will be described. The perforations 151 and 152 are shown as being diagonally staggered, corresponding to the position of sensing ports formed in the head and base assemblies 17 and 15, the arrangement being such that when the "action" perforation 151 is between the corresponding "action ports" (to be described) in the head and base assemblies the corresponding "control" perforation 152 is simultaneously between the corresponding "control" ports in the assemblies.

Other arrangements of the perforations would, however, be possible. For example, the corresponding action and control perforations 151 and 152 could be aligned with each other transversely across the belt, or all the action and control perforations of each column could be aligned in a single longitudinal line, providing they are so spaced in relation to the indexing movement of the belt that at the end of each indexing movement only action perforations are opposite action ports and only control perforations are opposite control ports. Such an arrangement of action perforations 153 and control perforations 154 is shown in Figure 7, which illustrates the provision of a separate narrow belt 155 for each unit to be controlled. An additional belt (not shown) would also be used to provide the master control, as will be described.

In order to accommodate a number of narrow belts the drum 5 (Figure 4) would be provided with an appropriate number of sets of projections 10 to engage the sprocket holes 156 (Figure 7) in the various belts.

The belts 9 and 155 are not shown to scale in Figures 6 and 7, but it may be noted that the longitudinal distances between successive action perforations and the corresponding distances between control perforations are in all cases equal to the distance $d$ through which the belt is moved at each indexing operation or to an exact multiple of this distance.

Figures 8, 9, 10:
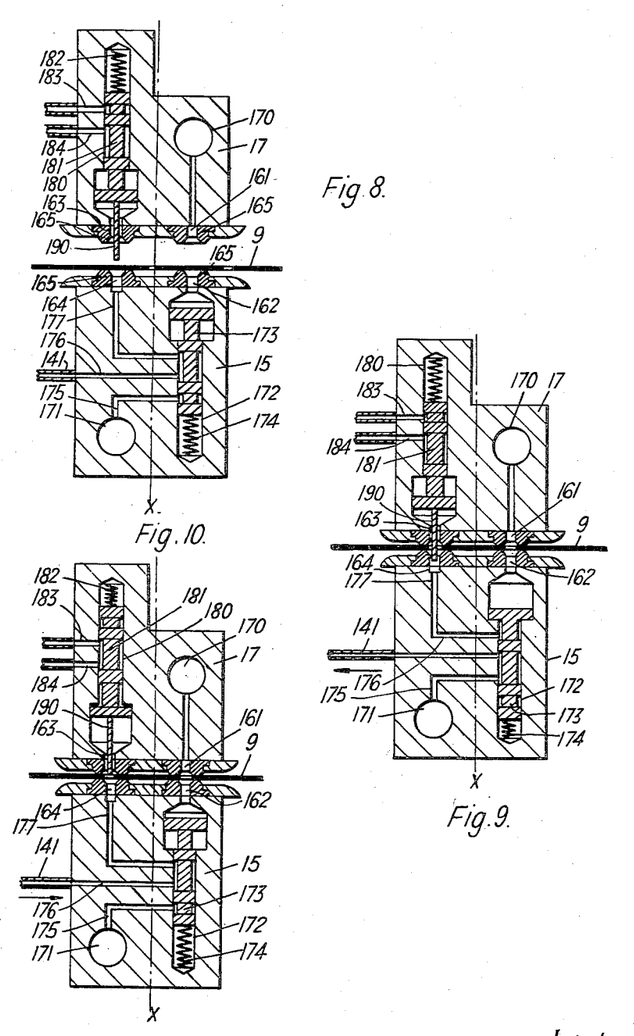
Figures 8 to 11 are diagrammatic sectional views illustrating the construction and operation of head and base valve assemblies forming the sensing mechanism of the apparatus shown in Figures 1 to 5, when used with the belt shown in Figure 6.
Figure 11:
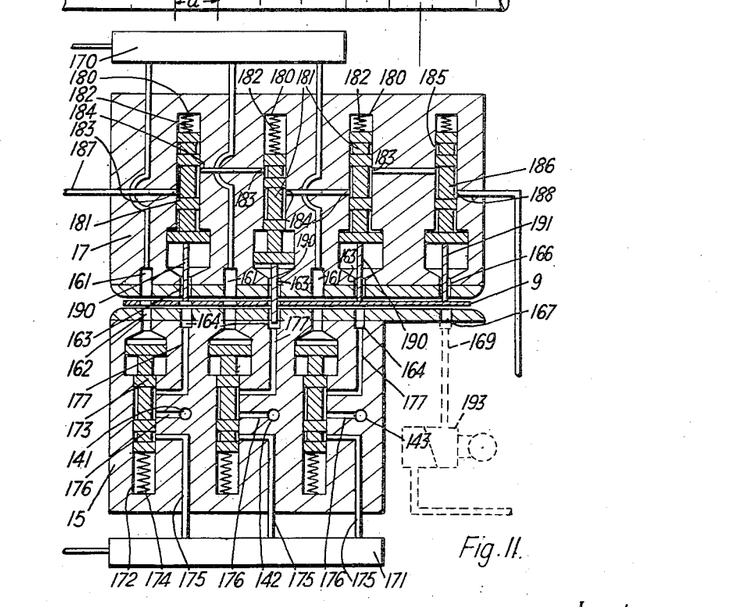

Referring now to Figure 8 to 11, these are diagrammatic views illustrating the arrangement and operation of the air passages, ports and valves in the head and base assemblies 17 and 15. In Figures 8 to 10, which show the position of the parts in different stages of the operation of the apparatus, the sections are taken in two vertical planes parallel to the length of the belt 9, the section on the left hand side of the line X corresponding to the lateral position of the control perforations 152 in the belt 9 and the section on the right hand side of the line X corresponding to the lateral position of the action perforations 151. Figure 11 is a vertical section taken transversely to the belt, the section being, however, adapted to pass through both the action and control ports in the assemblies 17 and 15, although these ports are actually staggered diagonally in a similar manner to the perforations 151 and 152 in the belt.

As shown in Figures 8 to 11, the head and base assemblies 17 and 15 are formed, for each of the columns A, B and C in the belt 9, with registering action and control ports 161, 162, 163 and 164, respectively, each of which ports is provided with a seal, such as 165 (omitted for the sake of clearness from Figure 11), made of a resilient material, such as natural or artificial rubber, or a suitable synthetic plastic. The belt 9 travels in contact with the seals on the base assembly 15, but it is engaged by the seals of the head assembly 17 only when the latter is moved to its lower position, as has been described (see Figures 9 and 10). The head and base assemblies are also formed with registering ports 166 and 167 (Figure 11) corresponding to the position of master control perforations, such as 168 (Figure 6), formed in the belt 9. The port 167 is connected by a pipe 169 (see also Figure 4) to the connection 147.

It will be appreciated that when the head 17 is lowered into contact with the belt 9, as shown in Figures 9 and 10, fluid-tight connections are formed between those of the upper ports 161, 163 and 166 and the corresponding lower ports 162, 164 and 167 which register with perforations in the belt 9. Where, however, there is no perforation the flow of fluid is prevented.

The head 17 is formed with a manifold 170 which is connected via the connection 137 (Figure 4) with the valve cylinder 118 (Figure 5) while the base unit 15 is formed with a manifold 171 which is connected via the connection 136 (Figure 4) with the valve cylinder 117 (Figure 5). Air is thereby supplied under pressure to all the action ports 161 in the head 17 and to a corresponding number of valve cylinders 172 formed in the base unit 15, all under the control of the piston valves 128 and 127, respectively. As has been stated, owing to the delayed opening of the valves 128 and 127, such air is only supplied after the head 17 has been lowered into contact with the belt 9.

If there is an action perforation in position between any pair of the ports 161 and 162, the air from the manifold 170 is transmitted to the upper end of the corresponding cylinder 172, where it acts on the upper end of a piston valve 173, which is thereby forced downwardly against the force of a spring 174. As shown, each of the cylinders 172 is formed with three ports opening into air passages 175, 176 and 177. All the passages 175 lead to the manifold 171, each of the passages 176 leads to the corresponding control pipe line 141, 142 or 143, while each of the passages 177 leads to the corresponding lower control port 164.

Formed in the head assembly 17 above each of the upper control ports 163 is a valve cylinder 180, provided with a piston valve 181 which is spring-urged downwardly by means of a compression spring 182. Each cylinder 180 is formed with a pair of ports 183 and 184 and the ports of successive cylinders are connected in series as shown in Figure 11, this series connection also including a master valve cylinder 185 communicating with the upper master control port 166, in which cylinder a similar spring-urged piston valve 186 is mounted. The inlet port 183 of the first of the series valve cylinders 180 (Figure 11) is connected by a pipe 187 to the source of service air, while the final port 188 of the master series valve cylinder 185 is connected to the inlet connection 129 below the piston 126 of the valve controlling the operation of the main cylinder 19. The series connected cylinder 180 and master cylinder 185 complete a fluid pressure energy supplying path that actuates the piston 126 to release the master control unit for further actuations. The piston 126 acts as a releasable stop means since it responds to actuation of the master control unit and blocks further actuations until it is released by the above described energy supplying path. The piston valves 181 and 186 control the establishment or interruption of the energy supplying path.

When one of the piston valves 173 is depressed by the pressure of air transmitted through an action perforation between the ports 161 and 162, it opens connection between the air manifold 171 and the corresponding control line, such as 141, and pressure air is thereby transmitted through the line 141 to operate the corresponding actuating unit. As has been explained, the valve 127 (Figure 5) moves to its upper position, thus cutting off the supply of service air to the manifold 171, and connecting the latter to exhaust, before the valve 128 moves upwardly. Consequently during the time that the valve 173 is held depressed by air pressure the control line 141 is connected to exhaust and pressure in it is relieved.

As will be described, the remote slave control units connected to the lines 141, 142 and 143 are so constructed that, when the mechanism operated or controlled by one of the units has completed its prescribed movement, pressure air is returned by the said unit to the corresponding line 141, 142 or 143. By this time the upward movement of the valve 128 will have allowed air to exhaust from the manifold 170 and the corresponding valve 173 will be in its upper position, as shown in Figure 10. The returning air pressure from the control line, such as 141, will thereby be conveyed past the valve 173, through the ports 164 and 163, via the corresponding control perforation in the belt 9, and into the lower end of the appropriate valve cylinder 180. The valve 181 will thereby be moved into its upper position, as shown in Figure 10, to provide a connection between the ports 183 and 184 of its cylinder 180.

As will appear from a consideration of Figure 11, the service air from the connection 187 can only be transmitted through the head 17 providing that all the series valves 181 and the valve 186 are in their raised positions. Should any valve remain in its lower position, like the second valve of Figure 11, the supply of service air to the lower end of the valve cylinder 116 (Figure 5) will be cut off and the next indexing operation of the mechanism operated by the cylinder 19 cannot take place. Consequently, the initiation of an indexing operation after the operation of one or more of the slave control units provides a sure indication that the mechanisms controlled by those units must have completed their prescribed operations so as to cause the transmission of return control signals in the form of pressure air back along the corresponding control lines, such as 141, in order to lift the previously depressed piston valve 181.

In order to provide for those cases in which no operation of a particular mechanism is required and for which, consequently, no action and control perforations are provided in the belt 9, each of the valve pistons 181 is provided with a dependent feeler member 190. Where there is a control perforation in the belt the corresponding feeler member drops freely through it, as shown in Figure 9. Where, however, there is no such perforation the engagement of the feeler member 190 with the belt holds the corresponding valve member 181 in its upper position, assuming that the head 17 is engaged with the belt, as is also shown in the case of the third valve member 181 in Figure 11.

The master control valve 186 is also provided with a similar feeler member 191. So long as there is no perforation 168 (Figure 6) in the master control column M in the belt 9, this feeler member 191 maintains the valve 186 in its raised position, the head 17 being in contact with the belt 9. This ensures that, immediately all those mechanisms which have been operated by air pressure transmitted through the appropriate action perforations in the belt 9 have completed their required operations and the resulting control signals transmitted back along the control lines have raised the corresponding valves 181, service air will automatically be transmitted from the service air connection 187 through the port 188 and connection 129 (Figure 5) to the lower end of the valve cylinder 116. This will initiate the next indexing operation. Thus the apparatus will produce a continuous cycle of operations of the mechanisms controlled by it.

In cases, however, when a limited cycle of operations is required and it is desired to provide separate means for starting successive indexing operations, a master control perforation 168 is provided in the appropriate place in the belt 9. This allows the valve 186 to remain in its lower position, when the head 17 descends, thus preventing the supply of air to the lower end of the valve cylinder 116 unless the valve 186 is raised by independent means. These means may be operated manually, mechanically or otherwise, either in accordance with the will of the operator or automatically upon the completion of some prescribed operation or upon the occurrence of some particular condition in the apparatus controlled. For this purpose the lower master control port 167 is connected by way of the line 169, connection 147 and a suitable control valve 193, with the service air supply. Operation of the valve 193, allowing the air to be admitted to the cylinder 185, causes the raising of the piston valve 186 and the initiation of an indexing operation, assuming that all the valves 181 are in their raised positions. The cutting off of the air supply and the opening of the connection 168 to exhaust, by the valve 193, frees the piston valve 186 so that the feeler 191 will drop through the next perforation to come opposite it in the belt 9, thus causing the arrival of such a perforation to cause a halt in the operation of the indexing mechanism and of the apparatus as a whole.

As will be clear from a consideration of the drawings, all the piston valves 181 and 186 drop automatically when the head 17 is raised, this acts as a safeguard; the valves are only required to allow the passage of air from the inlet 187 during the periods when the head 17 is lowered.

Figure 12:
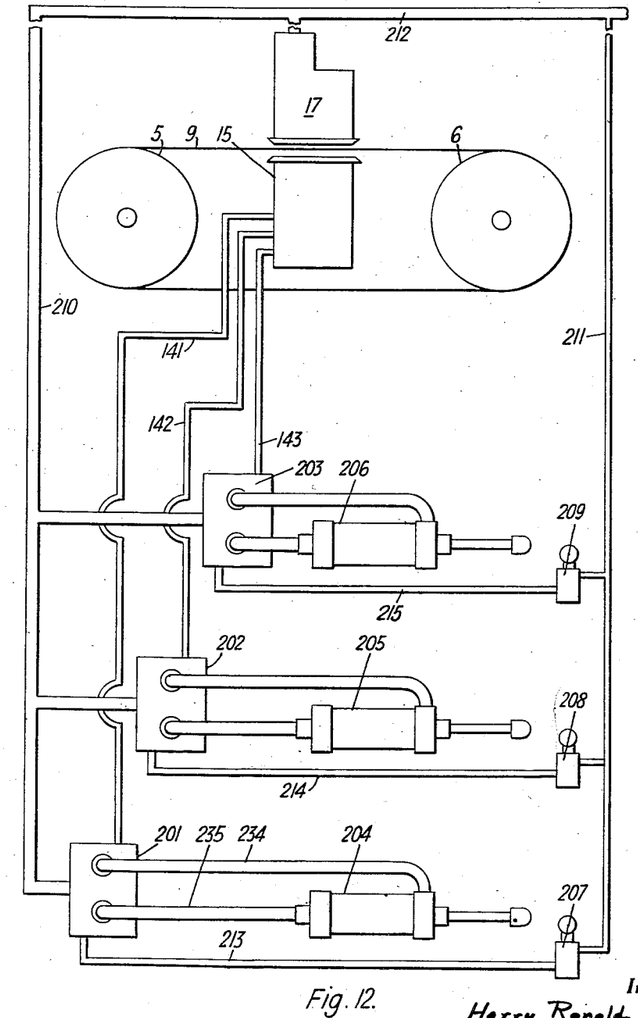
Figure 12 is a general diagrammatic view showing the connection of the master control unit with three slave control units, each of which latter controls the operation of a double-acting ram mechanism.

Referring now to Figure 12, this shows the connection of the three control lines 141, 142 and 143 to three slave control units 201, 202 and 203. Each of these units controls the operation of a corresponding double-acting, air-operated ram 204, 205 or 206, which is arranged to operate, or which forms part of, mechanism controlled by the apparatus. Each such mechanism also includes a limit valve 207, 208 or 209, which is normally closed but which is opened momentarily when the corresponding mechanism completes a prescribed operation.

The units 201, 202 and 203 and the limit valves 207, 208 and 209 are supplied, through pipe lines 210 and 211, with service air from the same supply main 212 which supplies the master control unit. Lines 213, 214 and 215 connect the limit valves 207, 208 and 209 with the corresponding units 201, 202 and 203.

The slave control units 201, 202 and 203 are of similar construction and one of these, 201, will now be described with reference to Figures 13 to 16. These figures show the unit in four different stages of its operation.

The unit 201 comprises a body 220 which is formed with three valve cylinders 221, 222 and 223, in which are mounted piston valves 224, 225 and 226. The valves 224 and 226 are inter-connected mechanically by means of a toggle-action mechanism comprising a pair of arms 227 and 228 which are pivoted to a support 229 and which are connected together by means of a tension spring 230. The arms 227 and 228 are capable of only limited angular movement relatively to each other and provide a snap action, toggle connection between the valve piston 224 and the valve 226. The valve 224 is operated in each direction by fluid pressure from the control line 141, as will be described, and by its movement it operates the valve 226 with a delayed snap action.

The valve 225 is adapted to be operated to the left against the force of a return spring 231 and by the pressure of service air admitted through the limit valve 207 and line 213.

The valve body 201 and the piston valves 224, 225 and 226 are constructed and arranged and are formed with inter-connecting air ports, passages and lands as shown in Figures 13 to 16. The passages 232 and 233 (Figure 13) are connected by pipes 234 and 235 (Figure 12) to the opposite ends of the ram 204, while the passages 236 and 237 are exhaust passages.

Figures 13, 14:
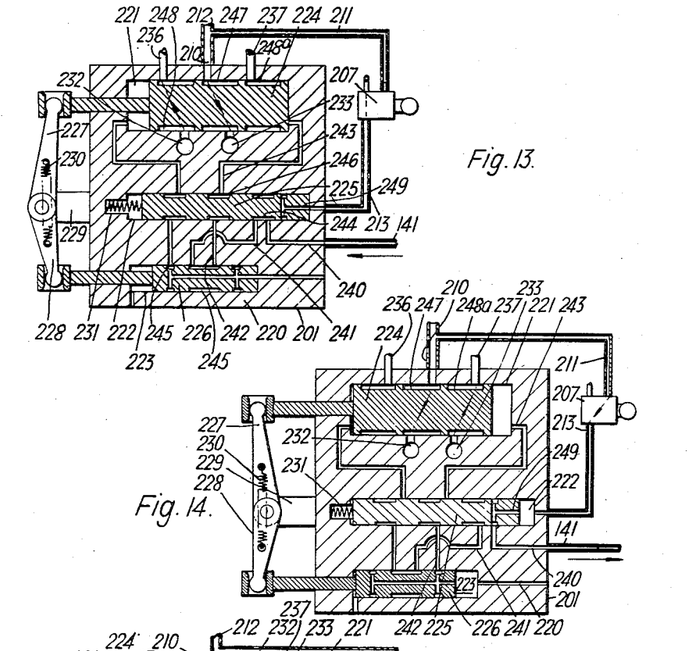

Prior to the reception of an action signal along the line 141, the parts of the unit 201 occupy the positions shown in Figure 13. When, however, an action signal is received the air pressure from the line 141 is transmitted to the right-hand end of the cylinder 221 through the passages 240, 241, 242 and 243 and past the lands 244, 245 and 246 in the valves 225 and 226.

The piston 224, which was previously connecting the service air supply pipe 210 to one end of the ram cylinder 204, by way of the land 247 and the passage 233, and which was connecting the other end of the ram cylinder to the exhaust 236 through the passage 232 and the land 248, now is thereby moved to the left and reverses these connections, so that the passage 232 is connected to the air supply 210 by way of the land 247, while the passage 233 is connected to the exhaust 237, by way of the land 248a, as is shown in Figure 14. During the latter part of the movement of the piston 224, which is completed by the toggle mechanism, the valve 226 is also moved to the left by the action of the same mechanism. As will appear, the movement of the valve 226, which is a reversing valve, has the effect of setting the unit ready for the reception of the next action signal.

In the meantime, under the action of pressure air supplied through the passage 232, the ram 204 is operated to the opposite limit of its travel. When it has done this, or alternatively when mechanism the operation of which was started by the movement of the ram has completed its own operation, the limit valve 207 is momentarily opened, thus causing service air from the line 211 to be supplied to the right-hand end of the cylinder 222 to operate the valve 225 against spring pressure. As the valve 225 completes its movement it allows the air pressure from the line 213 to be delivered, as a control signal, through the remainder of the return energy supplying path which includes passages 249 in the valve piston 225, and the control line 141. The pressure of this air, reaching the master control unit, operates the series valve 181 in the manner described.

Figure 15:
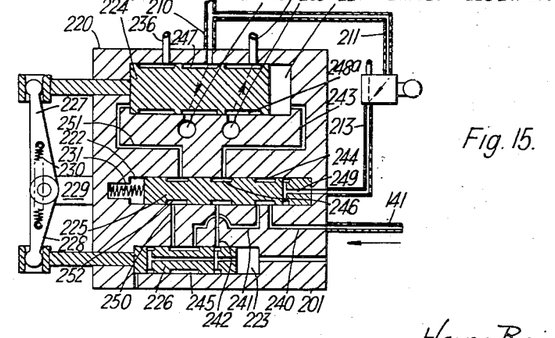

The valve 207 is designed to return automatically to its original position, in which it cuts off the supply of air to the line 213 and puts the latter in communication with exhaust. This allows the valve 225 to be returned to its right hand position by the spring 231, as shown in Figure 15.

When all the series valves 181, and also the valve 186, are in their upper position, the belt 9 is indexed forward to its next position. Assuming that, in this position, action and control perforations again come opposite the ports 161 and 163 in the head 17 and the corresponding ports in the base 15, a fresh action signal will be transmitted in the form of air pressure along the line 141 to the unit 201. In this case, however, owing to the changed position of the valve 226, as shown in Figure 15, the air pressure will be transmitted, by way of the passages 240, 241, 250 and 251 and the lands 244, 245 and 252 to the left hand end of the cylinder 221, thus forcing the piston 224 to the right. This reverses the connections of the passages 232 and 233 to the fluid supply 210 and to exhaust, respectively, thus causing the ram 204 to make a stroke in the return direction. When it has completed this stroke, or when the mechanism controlled by it has completed its operation, the limit switch 207 is opened and service air from the line 211 is again supplied as a control signal to the control line 141 by way of the passage 249, as previously described and as now shown in Figure 16.

The last movement of the piston 224, acting through the toggle mechanism, had the effect of returning the valve 226 to its initial, right hand position (Figures 13 and 16) thus ensuring that when the next action signal is received the valve 224 will again be operated to the left in the manner previously described with reference to Figure 13.

The function and operation of the individual parts of the apparatus will be clear from the preceding description, but the operation of the apparatus as a whole will now be briefly described.

It will be assumed, in the first place, that the various parts of the apparatus are in the positions shown in Figures 1 to 5, 8 and 13. The piston 20 has just completed its outward stroke, during which the belt 9 was indexed forward to bring a fresh set of perforations beneath ports in the head 17, which head is in its raised position. The timing valve 85 is in the position shown in Figure 5, in which it admits service air to the upper end of the cylinder 116, and the valve 126 having as a consequence, just been moved to its lower position, as shown. This allows service air to be admitted to the left-hand end (Figure 1) of the cylinder 19, thus causing the piston 20 to make an inward or return stroke. The resulting movement of the yoke piece 25, with its cam face 27, causes the head 17 to be lowered into contact with the belt 9, as shown in Figure 9.

It will be assumed that, in this particular position of the belt 9, there are action and control perforations registering with the corresponding ports in the head 17 and base 15 which control the two units 201 and 202 (through the lines 141 and 142) but not the unit 203, as is shown in Figure 11. It will also be assumed that there is no master control perforation between the ports 166 and 167.

By virtue of the downward movement of the head 17, the third of the pistons 181 (Figure 11) and the piston 186 are raised, by the engagement of their feeler members 190 and 191 against the belt 9, into their upper positions in their cylinders 180 and 185. In the case, however, of the first two pistons 181 their feeler members 190 pass freely through the perforations in the belt 9 and the pistons remain in their lower positions, as shown in Figure 9.

During the latter part of the inward movement of the piston 20 the timing valve 85 is moved to the left (Figure 5) upon the disengagement of the pawl 69 (Figure 4) from the collar 67. The valve 85 at once admits air to the upper ends of the valve cylinders 117 and 118, thereby depressing the piston valves 127 and 128. These valves admit service air to the manifolds 170 and 171 in the head 17 and base 15 respectively, it being noted that the head 17 has previously been lowered, as described, into fluid-tight contact with the belt.

Pressure of air from the manifold 170 forces down the two left-hand pistons 173 (Figure 11) which are opposite action perforations in the belt 9 and allows air from the manifold 171 to be transmitted down the control lines 141 and 142 to operate units 201 and 202. The unit 203 is not operated.

The dashpot 82, 87 retards the movement of the timing valve 85 to the left, but after a short interval the movement of this valve cuts off the supply of service air first to the cylinder 117 and then to the cylinder 118, these cylinders being connected to exhaust. The resulting upward movement of the valve 127 connects the manifold 171 to exhaust, thus relieving the pressure in all the control lines 141, 142 and 143, after which the connection of the manifold 170 to exhaust by the upward movement of the valve 128 relieves the pressure in the manifold 170 and allows those pistons 173 which have been depressed to move upwardly into the position shown in Figure 10.

The units 201 and 202, are actuated, in the manner previously described, by the pressure signals transmitted along the control lines 141 and 142, and operate the corresponding rams 204 and 205. When these rams reach the limits of their strokes, or alternatively, when the mechanisms the operation of which was started by the movement of the rams have completed their prescribed operations, the timing valves 207 and 208 are momentarily opened so as to cause the transmission of return pressure signals along the lines 141 and 142. These signals, passing through the control perforations, raise the corresponding pistons 181, as shown in Figure 10, thus connecting the ports 183 and 184.

Figure 11 shows the first of the pistons 181 to have been raised in this manner but, owing possibly to a failure of the corresponding mechanism to operate correctly, no return signal has yet been received to raise the second of the pistons 181, which is still in its lower position. The third of the pistons 181 and the piston 186 are held in their raised positions by the engagement of their feeler members 190 and 191 against the belt 9, as already described.

Owing to the second piston 181 remaining depressed, no air from the inlet connection 187 is transmitted through the series valves and the port 188 to the lower end of the valve cylinder 116 (Figure 5). Consequently, the piston 126 remains in its lower position and the apparatus will come to rest with no further operation of the indexing mechanism. This will indicate to the operator that there is a fault.

Should, however, the mechanism be operating correctly the second piston 181 will be raised by the return air pressure signal and air will be supplied through the series valves to the lower end of the cylinder 116, thus raising the valve 126. This reverses the air connections to the cylinder 19 and the piston 20 is thereby caused to make its next outward stroke. During the first part of this stroke the lost motion connection provided by the slide 53 operating in the slot 26 in the yoke piece 25 prevents the drive plate 37 from being operated. The first operation produced by the moving of the yoke piece 25 is the raising of the head 17, by the engagement of the cam face 27 with the roller 28. This lifting of the head from the belt 9 allows the latter to be indexed forwardly during the last part of the stroke of the piston 20 and brings the apparatus to the state shown in the drawings, with the consequent initiation of a further series of control operations.

The apparatus will continue to operate in this manner until the belt 9 is brought into a position in which a master control perforation is beneath the feeler member 191, which allows the piston 186 to remain in its lower position in its cylinder when the head 17 is lowered. This prevents the completion of the connection from the inlet 187 through the series valves to the cylinder 116 and prevents any further indexing. In order to re-start the operation of the apparatus the piston 186 must be raised. This could be done purely mechanically, but in the construction shown it is effected by operating the valve 193 in order to cause air pressure, passing through the master control perforation in the belt, to act on the piston 186.

The valve 193 could be operated manually by the operator, or it could be operated automatically in response to some particular condition of apparatus which is associated with the mechanism controlled by the units 201, 202 and 203. The valve 193 could, for example, be made responsive to temperature or pressure conditions, to the completion of counting or other mechanical operations, or it might be actuated by further control apparatus connected with some other group of units in a sectionalised installation.

Figure 17:
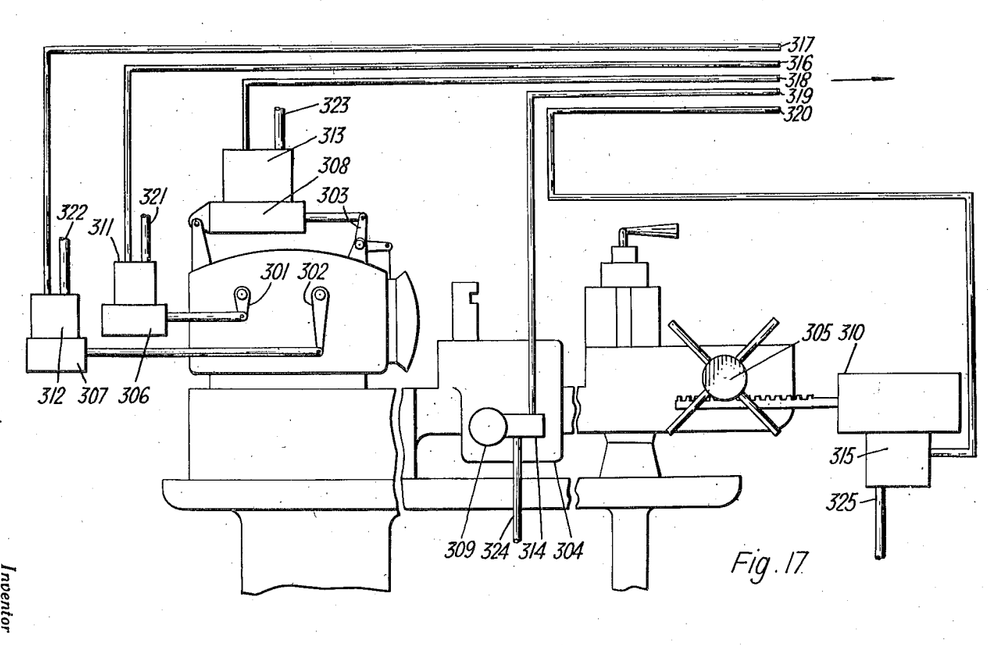
Figure 17 is a general view showing how the apparatus of the invention may be applied to the control of a turret lathe.

Figure 17 illustrates diagrammatically the application of the invention to a turret lathe. Such a lathe could have any desired number of controls, dependent on its construction and on the purpose for which it is to be used, but five such controls are shown.

These controls comprise a start-stop control 301, a forward-reverse control 302, a bar chuck control 303, a cross slide control mounted on the cross slide 304, and a turret control 305.

All these controls are arranged to be operated by means of double-acting, fluid-pressure-operated rams 306, 307, 308, 309 and 310 respectively, each of which corresponds in principle to one of the rams 204 to 206 of Figure 12 and each of which is provided with a unit 311, 312, 313, 314 and 315, which units correspond to the units 201 to 203 and each of which includes a limit switch (not shown).

The units 311 to 315 are connected to the master control unit (not shown) by means of small-diameter air lines 316 to 320, while pressure operating air is supplied to the rams 306 to 310 by means of service air lines 321 to 325.

The operation of the apparatus will be clear from the preceding description, it being noted that any selected sequence and timing of the operations of the lathe can be obtained by the use of a suitable sensing belt or belts.

It may be noted that although the use of a single sensing belt 9 (Figure 8) has been more particularly described it is often advantageous and preferable to use a number of individual belts, such as that shown in Figure 7.

Various modifications are possible. For example, a liquid or other fluid medium different from the sensing medium which is passed through the belt, could be used as the control fluid. Alternatively, other means which might be electrical or mechanical for example, could be used to cause the passage of the sensing fluid to control the operation of the controlled mechanisms such as the rams 204, 205 and 206. For example, the fluid pressure operated devices 173 (Figure 11) could be arranged to control electrical circuits which are connected to and are arranged to operate the units 201, 202 and 203, which units would be modified in order to respond, in an analogous manner, to electrical instead of to fluid pressure actuation.

Alternatively, it might be possible to provide a positive mechanical connection between the members 173 and the units 201, 202 and 203.

With the above arrangements the return signals could be electrical or mechanical, instead of in the form of fluid pressure signals. They could be transmitted back to the master control unit along the same lines as were used for the initial control signals.

Instead of using reciprocating rams 204, 205 and 206, the control mechanisms could be operated, or their operation could be controlled, by means including rotary motors operated by fluid pressure or by electrical or other means, as will be apparent to those skilled in the art.

For certain applications it might be possible to dispense with the use of indexing mechanism and of a movable belt and to use a sensing member in the form of a flat sheet or card, which is simply introduced manually or mechanically between the head 17 and the base 15. The position of the perforations in the sensing member would then select those out of a number of mechanisms which would be operated simultaneously by signals transmitted along the appropriate control lines.

For this application of the invention the head and base units would normally be provided with a considerable number of perforations, which could be spaced from each other both laterally and longitudinally of the units.

In the above way any combination of simultaneous operations could be produced by using a sensing member having the appropriate perforations.

This application of the invention could be applied to such things as mass sorting, the selective direction and movement of articles and the setting of the controls of multiple-purpose machines of various kinds.

I claim:

1. In apparatus of the class described: the combination with a number of operating mechanisms actuated through individual energy supplying paths, control means normally interrupting each path and responsive to initiation to establish said paths simultaneously and a master control unit actuatable for supplying energy to initiate said control means; of releasable stop means responsive to actuation of said master control unit for blocking further actuations thereof, and energy supplying means operatively connected to said stop means and to said operating mechanisms to respond, only after the operation of all of said mechanisms is completed, to release said stop means and unblock said master control unit.

2. In apparatus of the class described: the combination with a number of operating mechanisms actuated through individual energy supplying paths, control means normally interrupting each path and responsive to initiation to establish said paths simultaneously, and a master control unit actuatable for supplying energy to initiate said control means; of releasable stop means responsive to actuation of said master control unit for blocking further actuations thereof, an energy supplying path connected to said stop means for releasing the same to unblock said master control unit, and path interrupting means controlled by each operating mechanism and connected in series in said last mentioned path to normally interrupt such path, each such path interrupting means being responsive, only after the operation of its associated mechanism is completed, to establish the portion of said last mentioned path controlled by such interrupting means.

3. In apparatus of the class described: the combination with a number of operating mechanisms actuated through individual energy supplying paths, control means normally interrupting each path and responsive to initiation to establish said paths simultaneously, a master control unit actuatable for supplying energy to initiate said control means; and energy transmitting path means connecting said control means and said master control unit; of releasable stop means responsive to actuation of said master control unit for blocking further actuations thereof, energy supplying path means operatively connected to said stop means, and path interrupting means normally blocking said supplying path means and operatively connected to said operating mechanisms to respond, only after the operation of all of said mechanisms is completed, to complete said energy supplying path means and release said stop means to unblock said master control unit.

4. The invention of claim 3 wherein a control medium having path establishing portions in paired arrangement for simultaneous registration with said energy transmitting path means and said energy supplying path means is interposed in each of said path means to control actuation of said master control unit.

5. The invention of claim 4 wherein the master control unit has a head section and a base section providing successive portions through which said energy transmitting path means and said energy supplying path means extend with said control medium disposed between said sections and establishing each path means from said head unit to said base unit.

6. The invention of claim 3 wherein said energy transmitting path means and said energy supplying path means each include a plurality of parallel paths and said path interrupting means includes a plurality of elements, and a control medium, having path establishing portions arranged in cooperating pairs for simultaneous registration with corresponding paths of said energy transmitting path means and said energy supplying path means and having path interrupting portions arranged in cooperating pairs for simultaneous registration with other corresponding paths of said energy transmitting path means and said energy supplying path means, is interposed in each of said path means to actuate said master control unit and permit energy flow over said first mentioned corresponding paths while blocking energy flow over said last-mentioned corresponding paths, said control medium cooperating with said elements such that said path interrupting portions engage the elements associated with the paths interrupted thereby and prevent said last-mentioned portions from interrupting said last-mentioned paths.

7. In apparatus of the class described: the combination with a number of operating mechanisms actuated through individual energy supplying paths, separate control units in each path normally interrupting the same and responsive to initiation to establish said paths, a master control unit actuatable for supplying energy, and a number of parallel energy transmitting paths connecting said separate control units to said master control unit such that actuation of said master unit initiates said separate control units simultaneously; of releasable stop means responsive to actuation of said master control unit for blocking further actuations thereof; an energy supplying path connected to said stop means for actuating the same to unblock said master control unit, said last mentioned path including series connected path interrupting means, there being one such path interrupting means for each parallel energy transmitting path, a return energy supplying path for each of said path interrupting means for actuating the same to establish the energy supplying path for said stop means, each return energy supplying path being connected to one of said first path interrupting means through one of said control units and through one of said parallel energy transmitting paths, and second path interrupting means in each return energy supplying path, each of said second interrupting means being operatively connected with one of said operating mechanisms and responsive to the completed operation thereof for establishing the associated return energy supplying path.

8. In apparatus of the class described: the combination with an operating mechanism actuated through an energy supplying path, a control unit normally interrupting said path and responsive to energization to establish said path, a master control unit actuatable for supplying energy through an energy transmitting path to energize said control unit and establish said energy supplying path; of releasable stop means responsive to actuation of said master control unit for blocking further actuations thereof, a second energy supplying path connected to said stop means for releasing the same to unblock said master control unit, path interrupting means in said second energy supplying path normally interrupting the same, a return energy supplying path connected to said interrupting means to actuate the same and establish said second energy supplying path, path interrupting means in said return energy supplying path normally interrupting the same and responsive to the completed operation of said mechanism for establishing said path, and a control medium, having path establishing portions in paired arrangement for simultaneous registration with said energy transmitting path and said return energy supplying path means, interposed in each of said path means to control actuation of said master control unit.

9. In apparatus of the class described: the combination with an operating mechanism actuated through an energy supplying path, a control unit normally interrupting said path and responsive to energization to establish said path, a master control unit actuatable for supplying energy through an energy transmitting path to energize said control unit and establish said energy supplying path; of releasable stop means responsive to actuation of said master control unit for blocking further actuations thereof, a second energy supplying path connected to said stop means for releasing the same to unblock said master control unit, a path interrupting element in said second energy supplying path normally interrupting the same and connected to said operating mechanism to respond to the completed operation of said mechanism and establish said second energy supplying path, and a control medium, having path establishing portions in paired arrangement for simultaneous registration with said energy transmitting path and said second energy supplying path, interposed in each of said last mentioned paths to control actuation of said master control unit.

10. In apparatus of the class described: the combination with an operating mechanism actuated through an energy supplying path, a control unit normally interrupting said path and responsive to energization to establish said path, a master control unit actuatable for supplying energy through an energy transmitting path to energize said control unit and establish said energy supplying path; of releasable stop means responsive to actuation of said master control unit for blocking further actuations thereof, a second energy supplying path connected to said stop means for releasing the same to unblock said master control unit, path interrupting means in said second energy supplying path normally interrupting the same and connected to said operating mechanism to respond to the completed operation of said mechanism and establish said second energy supplying path therethrough, path establishing means in series in said second energy supplying path, and a control medium having successive sets of establishing portions in paired arrangement for simultaneous registration with said energy transmitting path and said second energy supplying path and having a main control portion cooperating with one of said sets for simultaneous coaction with said path establishing means to actuate the same and interrupt said second energy supplying path, said control medium being interposed in each of said last mentioned paths to control actuation of said master control unit.

11. The invention of claim 10 wherein an indexing mechanism moves said sets into registration with said paths successively in response to each release of said stop means such that operation continues until said operating mechanism fails or said main control portion engages said path establishing means.

12. In a master control unit having an energy transmitting path for controlling the initiation of operation of a mechanism, said unit being actuatable to supply control energy through said path, releasable stop means responsive to actuation of said master control unit to prevent further actuation thereof and hence to prevent said unit from again supplying energy through said path, and an energy supplying path for releasing said stop means, said energy supplying path being responsive to the completed operation of said mechanism for supplying releasing energy to said stop means, the improvement wherein said master control unit includes a movable control medium having successive sets of path establishing portions in paired arrangement for simultaneous registration with said paths with said medium interposed in each of said paths to control actuation of said master control unit.

13. In a master control unit having an energy transmitting path for controlling the initiation of operation of a mechanism, said unit being actuatable to supply control energy through said path, releasable stop means responsive to actuation of said master control unit to prevent further actuation thereof and hence to prevent said unit from again supplying energy through said path, and an energy supplying path for releasing said stop means, said energy supplying path being responsive to the completed operation of said mechanism for supplying releasing energy to said stop means, the improvement wherein said master control unit includes a movable control medium having successive sets of path establishing portions in paired arrangement for simultaneous registration with said paths with said medium interposed in each of said paths to control actuation of said master control unit, and an indexing mechanism operating said movable control medium to move said sets into registration with said paths successively in response to each release of said stop means such that operation of said mechanism repeats.

14. In a master control unit having an energy transmitting path for controlling the initiation of operation of a mechanism, said unit being actuatable to supply control energy through said path, releasable stop means responsive to actuation of said master control unit to prevent further actuation thereof and hence to prevent said unit from again supplying energy through said path, and an energy supplying path for releasing said stop means, said energy supplying path being responsive to the completed operation of said mechanism for supplying releasing energy to said stop means, the improvement wherein said master control unit includes path establishing means in series in said energy supplying path, a movable control medium, having successive sets of path establishing portions in paired arrangement for simultaneous registration with said paths and having a main control portion corresponding to one of said sets and coacting with said path establishing means to actuate the same and interrupt said energy supplying path interposed in each of said paths to control actuation of said master control unit, and an indexing mechanism engages said control medium to move said sets into registration with said paths successively in response to each release of said stop means such that said mechanism repeats its operation until said main control portion engages said path establishing means.

15. The invention of claim 12 wherein the master control unit has a head section and a base section providing successive portions of each of said paths with said control medium disposed between said sections and establishing each path from said head section to said base section.

16. The arrangement of claim 7 wherein a control pulse of energy of limited duration is transmitted along the energy transmitting paths from said master control unit to said separate control units and terminates prior to the start of a return pulse of energy of limited duration delivered along the return energy supplying paths.

17. The arrangement of claim 16 wherein the control and return pulses are provided by fluid under pressure, the pressure in the energy transmitting paths being relieved between the end of the control pulse and the start of the return pulse.

18. The arrangement of claim 12 wherein fluid circuits constitute said paths and wherein said control medium consists of a movable belt having successive sets of fluid perforations in paired arrangement for simultaneous registration with said fluid circuits, said belt being interposed in each of said circuits.

19. The arrangement of claim 18 wherein the master control unit has a head section and a base section providing successive fluid circuit portions through which said fluid circuits extend with the movable belt being disposed between said sections and controlling the establishment of said fluid circuits therethrough, the head section being movable towards and away from the base section and being supplied with actuating fluid for controlling the initiation of operation of said mechanism.

20. The arrangement of claim 19 wherein an indexing mechanism operates said movable belt to move said sets of perforations into registration with said fluid circuits successively in response to each release of said stop means, said indexing mechanism operating in conjunction with the movable section such that the movable section is moved into engagement with the control belt after the completion of an indexing operation and such that said head section is disengaged from the control belt prior to the starting of a further indexing operation.

21. The arrangement of claim 19 wherein said belt is formed with master perforations corresponding to one or more of said sets and wherein valve means are carried in the head section in the fluid circuit portion that forms a part of said energy supplying path, said valve means having feeler means projecting from said head section for engagement with said control belt or for passage through master perforations therein, the arrangement being such that where there is a perforation, the valve means is actuated to establish said energy supplying path only by manual control whereas in the absence of a perforation the valve means is actuated by engagement of said feeler means with said belt.

22. The arrangement of claim 7 wherein fluid circuits constitute the parallel energy transmitting paths, and the return energy supplying paths, and wherein said master control unit includes a head section and a base section forming successive fluid circuit portions through which said fluid circuits extend, and a movable control belt having successive sets of perforations in paired arrangement for simultaneous registration with selected sets of said fluid circuit portions is interposed between said sections to control the establishment of said fluid circuits therethrough, the head section being movable towards and away from said base section and being supplied with actuating fluid for controlling the initiation of operation of the mechanisms associated with said selected sets of fluid circuit portions.

23. The arrangement of claim 22 wherein the first-mentioned path interrupting means carry movably mounted feelers that project from said head section to engage the belt or to pass through a perforation in the belt such that absence of a perforation moves the feeler relative to the head section and establishes the path portion controlled by the path interrupting means that carries said feeler.

24. In apparatus of the type wherein an operating mechanism is actuated through an actuating path, control means normally interrupt said path and respond to initiation to establish said path, an energy transmitting path connects said control means to a master control unit that is actuatable for supply pulses of energy to initiate said control means, releasable stop means respond to actuation of said master control unit for blocking further actuations thereof, and a return energy supplying path actuates said stop means in response to the completed operation of said mechanism to release said stop means and unblock said master control unit, the improvement wherein said return path is connected to said control means, and said control means includes movable means responsive to initiation by a pulse of control energy from said master control unit for movement to establish said actuating path, and second movable means connected to and responsive to movement of said first mentioned movable means for establishing a connecting path from said return path to said transmitting path whereby pulses of return energy return through said transmitting path for releasing said stop means.

References Cited in the file of this patent

UNITED STATES PATENTS

| | | |
|---|---|---|
| 627,385 | Brockie | June 20, 1899 |
| 2,627,280 | Adelson | Feb. 3, 1953 |
| 2,678,063 | Ellis | May 11, 1954 |
| 2,805,552 | Hudson | Sept. 10, 1957 |